United States Patent
Oh et al.

(10) Patent No.: US 11,318,926 B2
(45) Date of Patent: May 3, 2022

(54) OUTPUT TORQUE CONTROL APPARATUS FOR HYBRID VEHICLES, METHOD FOR CONTROLLING OUTPUT TORQUE THEREOF AND HYBRID VEHICLE INCLUDING THE SAME

(71) Applicants: Hyundai Motor Company, Seoul (KR); Kia Motors Corporation, Seoul (KR)

(72) Inventors: Neung Seop Oh, Seoul (KR); Hyung Seuk Ohn, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 307 days.

(21) Appl. No.: 16/553,779

(22) Filed: Aug. 28, 2019

(65) Prior Publication Data
US 2020/0298821 A1    Sep. 24, 2020

(30) Foreign Application Priority Data
Mar. 22, 2019 (KR) .................. 10-2019-0033110

(51) Int. Cl.
| | |
|---|---|
| *B60W 10/06* | (2006.01) |
| *B60W 20/10* | (2016.01) |
| *B60W 10/08* | (2006.01) |
| B60K 6/22 | (2007.10) |

(52) U.S. Cl.
CPC ............ *B60W 20/10* (2013.01); *B60W 10/06* (2013.01); *B60W 10/08* (2013.01); *B60K 6/22* (2013.01); *B60W 2510/0208* (2013.01); *B60W 2510/102* (2013.01); *B60W 2510/1025* (2013.01); *B60W 2520/30* (2013.01); *B60W 2540/10* (2013.01); *B60W 2710/0666* (2013.01); *B60W 2710/083* (2013.01); *B60Y 2200/92* (2013.01)

(58) Field of Classification Search
None
See application file for complete search history.

(56) References Cited

U.S. PATENT DOCUMENTS

| | | | |
|---|---|---|---|
| 2017/0050634 A1* | 2/2017 | Kang | ................. B60W 20/30 |
| 2018/0072301 A1* | 3/2018 | Itagaki | ................. B60W 20/19 |

* cited by examiner

*Primary Examiner* — James M McPherson
(74) *Attorney, Agent, or Firm* — Mintz Levin Cohn Ferris Glovsky and Popeo, P.C.; Peter F. Corless (57) ABSTRACT

An output torque control apparatus for hybrid vehicle is provided. The apparatus includes a motor controller that adjusts motor torque, an engine controller that adjusts engine torque, and a hybrid controller that operates the motor controller and the engine controller based on driving modes of a hybrid vehicle. The hybrid controller calculates transmission input torque corresponding to current request torque, confirms whether a current driving mode an EV mode or a HEV mode, calculates inertia compensation torque corresponding to the confirmed current driving mode, and calculates output torque based on the calculated inertia compensation torque and transmission input torque. Accordingly, at least one of the motor controller or the engine controller is operated based on the calculated output torque.

18 Claims, 5 Drawing Sheets

OUTPUT TORQUE CONTROL APPARATUS FOR HYBRID VEHICLES, METHOD FOR CONTROLLING OUTPUT TORQUE THEREOF AND HYBRID VEHICLE INCLUDING THE SAME

CROSS-REFERENCE TO RELATED APPLICATION(S)

This application claims the benefit of Korean Patent Application No. 10-2019-0033110, filed on Mar. 22, 2019, which is hereby incorporated by reference as if fully set forth herein.

BACKGROUND

Field of the Invention

The present invention relates to an output torque control apparatus for hybrid vehicles, and more particularly, to an output torque control apparatus for hybrid vehicles which may uniformly adjust change in output torque occurring when an engine clutch of a hybrid vehicle is closed and opened, a method for controlling output torque thereof and a hybrid vehicle including the same.

Discussion of the Related Art

In general, a hybrid vehicle uses two power sources, mainly, an engine and a motor. The hybrid vehicle has excellent fuel efficiency and power performance and is advantageous in reduction of exhaust gas, compared to a vehicle having an internal combustion engine alone, and thus, development of hybrid vehicles is ongoing.

The hybrid vehicle may be operated in two driving modes according to which powertrain is driven. The two driving modes include an electric vehicle (EV) mode in which the hybrid vehicle is driven using an electric motor alone, and a hybrid electric vehicle (HEV) mode in which the hybrid vehicle is driven by power acquired by operating both the electric motor and an engine. Therefore, the hybrid vehicle may perform conversion between the two modes according to driving conditions.

However, in the hybrid vehicle, if an engine clutch is closed or opened to convert the EV mode to the HEV mode or the HEV mode to the EV mode, lurching may occur due to change in output torque caused by change in inertia of a drive system (e.g., the engine, the motor and a transmission). In other words, in an acceleration state of the vehicle in which the vehicle is stopped and then started, loss of driving force occurs due to an inertia property in which the vehicle tends to be continuously stopped, but, in a deceleration situation of the vehicle, the vehicle is continuously driven without driving of the engine/motor due to an inertial property in which the vehicle tends to maintain movement.

For example, if there is no shifting in a vehicle using a single driving force (e.g., gasoline, diesel or the like), an engine and a transmission are always connected, and thus inertia of a drive system is constant in acceleration and deceleration and change in inertia may have characteristics of a continuous function of rotational speed alone. However, in the hybrid vehicle, when the engine clutch is closed and opened in addition to change in a rotational speed, change of an inertia element occurs, discontinuity in output torque occurs, and thus lurching (e.g., a sense of deceleration or a sense of being pushed) may occur. Therefore, development of an output torque control apparatus for hybrid vehicles which may uniformly adjust change in output torque occurring when an engine clutch of a hybrid vehicle is closed and opened to secure stable control robustness is required.

SUMMARY

Accordingly, the present invention provides an output torque control apparatus for hybrid vehicles, a method for controlling output torque thereof and a hybrid vehicle including the same that substantially obviate one or more problems due to limitations and disadvantages of the related art.

An object of the present invention is to provide an output torque control apparatus for hybrid vehicles which may adjust motor torque and engine torque based on output torque calculated by compensating for change in inertia occurring when an engine clutch of a hybrid vehicle is closed and opened, to uniformly adjust output torque and thus to secure stable control robustness, a method for controlling output torque thereof and a hybrid vehicle including the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an output torque control apparatus for hybrid vehicles may include a motor controller configured to adjust motor torque, an engine controller configured to adjust engine torque, and a hybrid controller configured to operate the motor controller and the engine controller based on driving modes of a hybrid vehicle.

The hybrid controller may be configured to calculate transmission input torque that corresponds to current request torque, confirms whether a current driving mode of the hybrid vehicle is an electric vehicle (EV) mode or a hybrid electric vehicle (HEV) mode, calculate inertia compensation torque that corresponds to the confirmed current driving mode, calculate output torque based on the calculated inertia compensation torque and transmission input torque, and operate at least one of the motor controller or the engine controller based on the calculated output torque.

In another aspect of the present invention, a method for controlling output torque of an output torque control apparatus for hybrid vehicles, including a hybrid controller configured to operate a motor controller and an engine controller, may include calculating, by the hybrid controller, transmission input torque that corresponds to current request torque, confirming, by the hybrid controller, whether t a current driving mode of a hybrid vehicle is an electric vehicle (EV) mode or a hybrid electric vehicle (HEV) mode, calculating, by the hybrid controller, inertia compensation torque that corresponds to the confirmed current driving mode, calculating, by the hybrid controller, output torque based on the calculated inertia compensation torque and transmission input torque, and operating, by the hybrid controller, at least one of the motor controller or the engine controller based on the calculated output torque.

In yet another aspect of the present invention, a non-transitory computer readable recording medium having a program recorded therein to execute a method for controlling output torque of an output torque control apparatus for hybrid vehicles may execute a process provided by the method for adjusting output torque of the output torque control apparatus for hybrid vehicles.

In a further aspect of the present invention, a hybrid vehicle may include a hybrid power source having a motor and an engine, and an output torque control apparatus configured to adjust output torque of the hybrid power source. The output torque control apparatus may include a motor controller configured to adjust torque of the motor, an engine controller configured to adjust torque of the engine, and a hybrid controller configured to calculate transmission input torque that corresponds to current request torque, to confirm whether a current driving mode of the hybrid vehicle is an electric vehicle (EV) mode or a hybrid electric vehicle (HEV) mode, calculate inertia compensation torque that corresponds to the confirmed current driving mode, calculate output torque based on the calculated inertia compensation torque and transmission input torque, and operate at least one of the motor controller or the engine controller based on the calculated output torque.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. However, the disclosure of the invention is not limited to the exemplary embodiments set forth herein and may be variously modified. In the drawings, in order to clearly describe the present invention, description of elements which are not related to the present invention is omitted, and the same or similar elements are denoted by the same reference numerals even though they are depicted in different drawings.

In the following description of the embodiments, it will be understood that a suffix "part", "unit" or "module" means a unit to process at least one function or operation, and it may be implemented by hardware, software, or a combination of hardware and software. In the following description of the embodiments, the same or similar elements are denoted by the same reference numerals even though they are depicted in different drawings. Hereinafter, with reference to FIGS. 1 to 8, an output torque control apparatus for hybrid vehicles, a method for controlling output torque thereof and a hybrid vehicle including the same in accordance with embodiments of the present invention will be described in detail.

Figure 1:
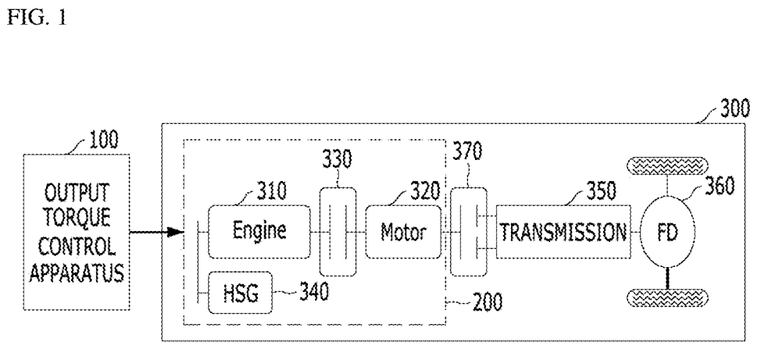
FIG. 1 is a schematic view illustrating a hybrid vehicle including an output torque control apparatus for hybrid vehicles in accordance with an exemplary embodiment of the present invention.

FIG. 1 is a schematic view illustrating a hybrid vehicle including an output torque control apparatus for hybrid vehicles in accordance with an exemplary embodiment of the present invention. As exemplarily shown in FIG. 1, a hybrid vehicle in accordance with the present invention may include a hybrid power source 200 having a motor 320 and an engine 310, and an output torque control apparatus 100 to adjust output torque of the hybrid power source 200.

Further, the hybrid vehicle may include a powertrain 300 including the hybrid power source. Particularly, the powertrain 300 may employ a parallel type hybrid system in which the motor 320 and an engine clutch 330 are installed between the internal combustion engine 310 and a transmission 350. In such a hybrid vehicle, when a driver engages an accelerator pedal after starting, the motor 320 may be driven using power of a battery under the condition that the engine clutch 330 is opened, and power of the motor is transmitted to the transmission 350 and a final drive (FD) 360, thus moving wheels (i.e., an EV mode).

When the hybrid vehicle is gradually accelerated and requires greater driving force, a hybrid starter generator (HSG) 340 may be operated to drive the engine 310. Accordingly, when rotational speeds of the engine 310 and the motor 320 become equal, the engine clutch 330 may be closed and both the engine 310 and the motor 320 drive the vehicle (i.e., transition from the EV mode to an HEV mode). Thereafter, when predetermined engine off conditions, such as deceleration of the hybrid vehicle, etc., are satisfied, the engine clutch 330 may be opened and the engine 310 is stopped (i.e., transition from the HEV mode to the EV mode).

In particular, the hybrid vehicle may be configured to charge the battery through the motor 320 using driving force of the wheels, and such a mechanism is referred to as regeneration of braking energy or regenerative braking. Therefore, the HSG 340 may be operated as a starter motor when the engine 310 is started, and be operated as a generator after starting of the engine 310 or when rotational energy of the engine 310 is recovered in starting-off of the engine 310.

In the hybrid vehicle, torque of the engine 310, i.e., engine torque, may be adjusted by an engine controller of the output torque control apparatus 100, torque of the HSG 340 and the motor 320, i.e., motor torque, may be adjusted by a motor controller of the output torque control apparatus 100, and the engine clutch 330 may be adjusted by a clutch controller. The transmission 350 may be operated by a transmission controller, and a dual clutch 370 may be installed between the transmission 350 and the motor 320. In particular, the transmission 350 may be a general multi-stage automatic transmission (AT) or a dual clutch transmission (DCT).

The respective controllers may be connected to an upper-level controller, i.e., a hybrid controller (HCU) of the output torque control apparatus 100 configured to execute the entirety of a driving mode conversion process, and may be configured to receive information necessary to control the engine clutch 330 in driving mode conversion and gear shifting and/or information necessary to control stoppage of the engine 310 or perform operation based on a control signal from the hybrid controller. The output torque control apparatus 100 may include the motor controller configured to adjust torque of the motor 320, the engine controller configured to adjust torque of the engine 310, and the hybrid controller configured to operate the motor controller and the engine controller based on the driving mode of the hybrid vehicle.

Particularly, the hybrid controller of the output torque controller 100 may be configured to calculate transmission input torque that corresponds to current request torque, confirm whether the current driving mode of the hybrid vehicle is the EV mode or the HEV mode, calculate inertia compensation torque that corresponds to the confirmed current driving mode, calculate output torque based on the calculated inertia compensation torque and transmission input torque, and operate at least one of the motor controller or the engine controller based on the calculated output torque.

Accordingly, the hybrid vehicle including the output torque control apparatus 100 in accordance with the present invention may be configured to adjust motor torque and engine torque based on output torque calculated by compensating for change in inertia occurring when the engine clutch 330 of the hybrid vehicle is closed and opened, thereby uniformly adjusting output torque and thus securing stable control robustness. In other words, in the present invention, if request torque is not changed during driving of the hybrid vehicle, change in inertia when the engine clutch 330 is closed and opened may be actively compensated for, and thus transmission output torque may not be changed and occurrence of a sense of difference in driving (e.g., a sense of deceleration or a sense of being pushed) before/after the engine clutch 330 is closed/opened may be prevented.

Figure 2:
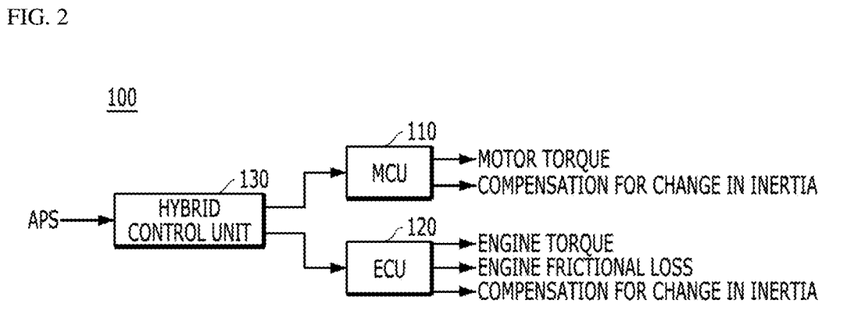
FIG. 2 is a block diagram illustrating the output torque control apparatus for hybrid vehicles in accordance with an exemplary embodiment of the present invention.

FIG. 2 is a block diagram illustrating the output torque control apparatus for hybrid vehicles in accordance with an exemplary embodiment of the present invention. As exemplarily shown in FIG. 2, the output torque control apparatus 100 may include a motor controller 110 configured to adjust motor torque, an engine controller 120 configured to adjust engine torque, and a hybrid controller 130 configured to operate the motor controller 110 and the engine controller 120 based on the driving mode of the hybrid vehicle.

Particularly, the hybrid controller 130 may be configured to calculate transmission input torque that corresponds to current request torque, confirm whether the current driving mode of the hybrid vehicle is the EV mode or the HEV mode, calculate inertia compensation torque that corresponds to the confirmed current driving mode, calculate output torque based on the calculated inertia compensation torque and transmission input torque, and operate at least one of the motor controller 110 or the engine controller 120 based on the calculated output torque.

Further, in the calculation of the transmission input torque that corresponds to the current request torque, the hybrid controller 130 may be configured to detect a position of an accelerator pedal from an accelerator pedal sensor (APS), calculate the current request torque requested by vehicle wheels based on the detected position of the accelerator pedal, and calculate the transmission input torque that corresponds to the calculated current request torque.

In addition, the hybrid controller 130 may be configured to calculate an angular acceleration of a drive shaft connected to the motor and the engine, prior to confirmation of the current driving mode of the hybrid vehicle. For example, the angular acceleration of the drive shaft may be equal to an angular acceleration of the rotational speed of the motor. Further, the hybrid controller 130 may be configured to calculate the angular acceleration by an equation:

Angular acceleration=Motor Speed Value/Time.

Thereafter, in confirmation of the current driving mode of the hybrid vehicle, the hybrid controller 130 may be configured to confirm whether the current driving mode is the EV mode or the HEV mode based on a closing or opening operation of the engine clutch. In particular, the hybrid controller 130 may be configured to confirm that the current driving mode is the EV mode if the engine clutch is opened to disconnect the drive shaft between the motor and the engine from each other, and confirm that the current driving mode is the HEV mode if the engine clutch is closed to connect the drive shaft between the motor and the engine to each other.

Thereafter, in the calculation of the inertia compensation torque, upon confirming that the current driving mode is the EV mode, the hybrid controller 130 may be configured to calculate the inertia compensation torque that corresponds to the EV mode by equations:

$$InertiaCompensationTorque = I_{ev} * \alpha, \quad I_{ev} = I_{mot}$$

wherein $I_{ev}$ being inertia torque in the EV mode, $\alpha$ being an angular acceleration of the drive shaft, and $I_{mot}$ being inertia torque of the motor. The inertia torque in the EV mode $I_{ev}$ may be calculated by an equation:

$$I_{ev} \approx (0.2 \sim 0.4) * I_{mot}$$

wherein $I_{ev}$ being inertia torque in the EV mode, and $I_{mot}$ being inertia torque of the motor.

Thereafter, in the calculation of the inertia compensation torque, upon confirming that the current driving mode is the HEV mode, the hybrid controller 130 may be configured to calculate the inertia compensation torque corresponding to the HEV mode by equations:

$$InertiaCompensationTorque = I_{hev} * \alpha, \quad I_{hev} = I_{HSG} \pm I_{eng} + I_{eng\_clutch} + I_{mot}$$

wherein $I_{hev}$ being inertia torque in the HEV mode, $\alpha$ being an angular acceleration of the drive shaft, $I_{HSG}$ being inertia torque of the HSG, $I_{eng}$ being inertia torque of the engine, $I_{eng\_clutch}$ being inertia torque of the engine clutch, and $I_{mot}$ being inertia torque of the motor.

In the calculation of the output torque, upon confirming that the current driving mode is the EV mode, the hybrid controller 130 may be configured to calculate output torque for compensation by the motor alone in which the inertia torque in the EV mode is compensated for. Particularly, in the calculation of the output torque for compensation by the motor alone, the hybrid controller 130 may be configured to calculate the output torque for compensation by the motor alone by an equation:

$$TQ_{mot} = TQ_{TMindemanded} + I_{ev} * \alpha$$

wherein $TQ_{mot}$ being output torque for compensation by the motor alone, $TQ_{TM\ in\ demanded}$ being transmission input torque, $I_{ev}$ being inertia torque in the EV mode, and $\alpha$ being an angular acceleration of the drive shaft.

Additionally, in the calculation of the output torque, upon confirming that the current driving mode is the HEV mode, the hybrid controller 130 may be configured to calculate output torque for preferential compensation by the motor in which the inertia torque in the HEV mode is compensated for, confirm whether the calculated output torque for preferential compensation by the motor is greater than maximum torque of the motor, and calculate output torque for subsidiary compensation by the engine when the calculated output torque for preferential compensation by the motor is greater than the maximum torque of the motor.

The hybrid controller 130 may be configured to maintain the calculated output torque for preferential compensation by the motor when the calculated output torque for preferential compensation by the motor is less than the maximum torque of the motor. In the calculation of the output torque for preferential compensation by the motor, the hybrid controller 130 may be configured to calculate the output torque for preferential compensation by the motor by an equation:

$$TQ_{mot} = (TQ_{TMindemanded} - TQ_{eng}) + I_{hev} * \alpha$$

wherein $TQ_{mot}$ being output torque for preferential compensation by the motor, $TQ_{TM\ in\ demanded}$ being transmission input torque, $TQ_{eng}$ being output torque for subsidiary compensation by the engine, $I_{hev}$ being inertia torque in the HEV mode, and $\alpha$ being an angular acceleration of the drive shaft.

Further, in the calculation of the output torque for subsidiary compensation by the engine, the hybrid controller 130 may be configured to calculate the output torque for subsidiary compensation by the engine by equations:

$$TQ_{eng} = (TQ_{TMindemanded} - TQ_{mot} - I'_{hev} * \alpha) + I''_{hev} * \alpha,$$
$$I_{hev} = I'_{hev} + I''_{hev}$$

wherein $TQ_{eng}$ being output torque for subsidiary compensation by the engine, $TQ_{TM\ in\ demanded}$ being transmission input torque, $TQ_{mot}$ being output torque for preferential compensation by the motor, $I_{hev}$ being inertia torque in the HEV mode, and $\alpha$ being an angular acceleration of the drive shaft.

Thereafter, in the operation of the at least one of the motor controller 110 or the engine controller 120, when the calculated output torque is the output torque for compensation by the motor alone, the hybrid controller 130 may be configured to output a torque command to adjust motor torque that corresponds to the output torque for compensation by the motor alone to the motor controller 110. In another case, in the operation of the at least one of the motor controller 110 or the engine controller 120, when the calculated output torque is the output torque for preferential compensation by the motor, the hybrid controller 130 may be configured to output a torque command to control motor torque that corresponds to the output torque for preferential compensation by the motor to the motor controller 110.

In yet another case, in the operation of the at least one of the motor controller 110 or the engine controller 120, when the calculated output torque is the output torque for subsidiary compensation by the engine, the hybrid controller 130 may be configured to output a first torque command to adjust motor torque to the motor controller 110 and output a second torque command to adjust engine torque to the engine controller 120, that corresponds to the output torque for subsidiary compensation by the engine.

As described above, the present invention provides technology in which the engine and/or the motor compensate for change in inertia occurring when the engine clutch is closed and opened to thus uniformly adjust output torque.

First, in the present invention, a target object of the hybrid vehicle in which change in inertia occurs may be defined. In the present invention, the target object may be power sources, i.e., the engine and the motor, and the hybrid vehicle may have inertia in the EV mode and inertia in the HEV mode. Inertia torques according to the respective modes may be expressed by equations below.

$$I_{ev} = I_{mot}$$

wherein $I_{ev}$ being inertia torque in the EV mode, $I_{mot}$ being inertia torque of the motor.

$$I_{hev} = I_{HSG} + I_{eng} + I_{eng\_clutch} + I_{mot}$$

wherein $I_{hev}$ being inertia torque in the HEV mode, $I_{HSG}$ being inertia torque of the HSG, $I_{eng}$ being inertia torque of the engine, $I_{eng\_clutch}$ being inertia torque of the engine clutch, and $I_{mot}$ being inertia torque of the motor.

In general, an equation $I_{ev} \approx (0.2{\sim}0.4) * I_{mot}$, wherein $I_{ev}$ being inertia torque in the EV mode, and $I_{mot}$ being inertia torque of the motor, may be satisfied.

Second, in the present invention, inertia compensation torque may be calculated. The engine and the HSG may be connected by a belt, and the engine, the engine clutch and the motor may be connected by one drive shaft. Therefore, the inertia compensation torque may be calculated by an equation below.

$$\text{InertiaCompensationTorque} = I_{ev} * \alpha$$

wherein $I_{ev}$ being inertia torque in the EV mode, and $\alpha$ being an angular acceleration of the drive shaft)

Particularly, the motor may be rotated during driving regardless of the EV and HEV modes, the motor and the engine are connected by one drive shaft, and thus the rotational speeds of the engine and the motor may be equal. Therefore, the angular acceleration $\alpha$ of the drive shaft may be calculated from the rotational speed of the motor alone.

Third, in the present invention, at least one of the engine or the motor may be determined as an inertia compensation subject. For example, in the EV mode, the motor may always compensate for change in inertia. Further, in the HEV mode, the motor may preferentially compensate for change in inertia. However, if motor output is unable to cope with an inertia compensation amount, the engine may subsidiarily compensate for change in inertia.

Fourth, in the present invention, inertia may be compensated for, and inertia compensation may be applied when the rotational speed of the motor is changed and the engine clutch is closed and opened. If the current driving mode is the EV mode, output torque for compensation by the motor alone in which the inertia torque in the EV mode is compensated for may be calculated by an equation below:

$$TQ_{mot} = TQ_{TMindemanded} + I_{ev} * \alpha$$

wherein $TQ_{mot}$ being output torque for compensation by the motor alone, $TQ_{TM\ in\ demanded}$ being transmission input torque, $I_{ev}$ being inertia torque in the EV mode, and $\alpha$ being an angular acceleration of the drive shaft.

In the present invention, a torque command to control or adjust motor torque that corresponds to the calculated output torque for compensation by the motor alone may be output to the motor controller 110. Further, if the current driving mode is the HEV mode, output torque for preferential compensation by the motor in which the inertia torque in the HEV mode is compensated for may be calculated by an equation below:

$$TQ_{mot} = (TQ_{TMindemanded} - TQ_{eng}) + I_{hev} * \alpha$$

wherein $TQ_{mot}$ being output torque for preferential compensation by the motor, $TQ_{TM\ in\ demanded}$ being transmission input torque, $TQ_{eng}$ being output torque for subsidiary compensation by the engine, $I_{hev}$ being inertia torque in the HEV mode, and $\alpha$ being an angular acceleration of the drive shaft.

In the present invention, a torque command to control or adjust motor torque that corresponds to the calculated output torque for preferential compensation by the motor may be output to the motor controller 110. Further, if the current driving mode is the HEV mode, when the output torque for preferential compensation by the motor is greater than maximum torque of the motor, output torque for subsidiary compensation by the engine in which the inertia torque in the HEV mode is compensated for may be calculated by equations below:

$$TQ_{eng} = (TQ_{TMindemanded} - TQ_{mot} - I'_{hev} * \alpha) + I''_{hev} * \alpha,$$
$$I_{hev} = I'_{hev} + I''_{hev}$$

wherein $TQ_{eng}$ being output torque for subsidiary compensation by the engine, $TQ_{TM\ in\ demanded}$ being transmission input torque, $TQ_{mot}$ being output torque for preferential compensation by the motor, $I_{hev}$ being inertia torque in the HEV mode, and $\alpha$ being an angular acceleration of the drive shaft.

In the present invention, corresponding to the calculated output torque for subsidiary compensation by the engine, a first torque command to control motor torque may be output to the motor controller 110, and a second torque command to adjust engine torque may be output to the engine controller 120.

Figure 3:
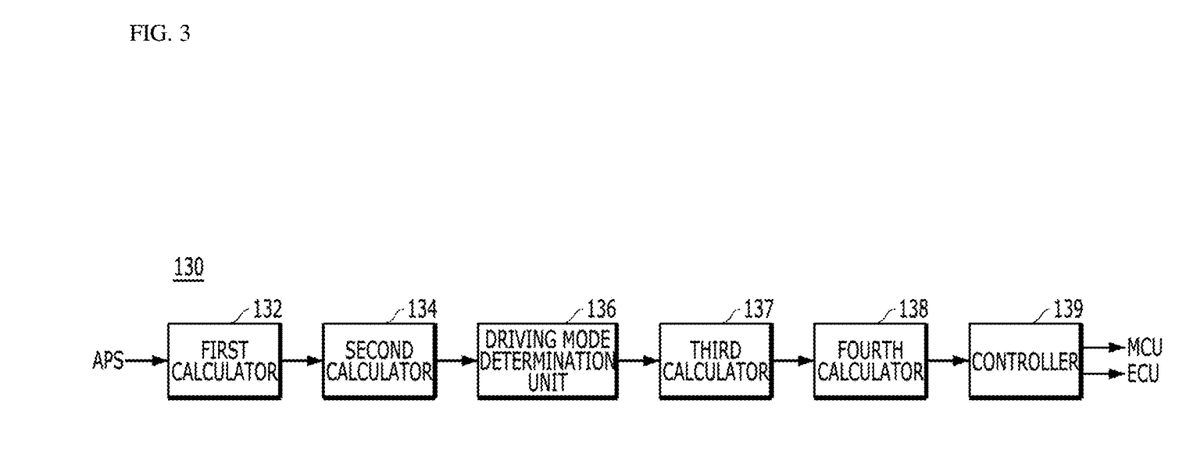
FIG. 3 is a block diagram illustrating a hybrid controller of FIG. 2 accordance with an exemplary embodiment of the present invention.

FIG. 3 is a block diagram illustrating the hybrid controller of FIG. 2. As exemplarily shown in FIG. 3, the hybrid controller 130 may include a first calculator 132, a second calculator 134, a driving mode determination unit 136, a third calculator 137, a fourth calculator 138 and a controller 139. The hybrid controller 130 may be configured to operate all the components thereof.

The first calculator 132 may be configured to calculate current request torque requested by the vehicle wheels based on the position of the accelerator pedal input from the accelerator pedal sensor (APS). Further, the second calculator 134 may be configured to calculate transmission input torque based on the calculated current request torque.

In some cases, the second calculator 134 may be configured to calculate an angular acceleration of the drive shaft connected to the motor and the engine. For example, the angular acceleration of the drive shaft may be equal to an angular acceleration of the rotational speed of the motor. Further, the second calculator 134 may be configured to calculate the angular acceleration by an equation below.

$$\text{Angular acceleration} = \text{Motor speed value}/\text{Time}$$

The driving mode determination unit 136 may be configured to confirm whether the current driving mode of the vehicle is the EV mode or the HEV mode. The driving mode determination unit 136 may additionally be configured to confirm whether the current driving mode of the vehicle is the EV mode or the HEV mode based on a closing or opening operation of the engine clutch.

For example, the driving mode determination unit 136 may be configured to confirm that the current driving mode is the EV mode when the engine clutch is opened to disconnect the drive shaft between the motor and the engine, and confirm that the current driving mode is the HEV mode when the engine clutch is closed to connect the drive shaft between the motor and the engine.

The third calculator 137 may be configured to calculate inertia compensation torque that corresponds to the confirmed driving mode. In response to confirming that the current driving mode is the EV mode, the third calculator 137 may be configured to calculate inertia compensation torque corresponding to the EV mode by equations:

$$\text{InertiaCompensationTorque} = I_{ev} * \alpha,\ I_{ev} = I_{mot}$$

wherein $I_{ev}$ being inertia torque in the EV mode, $\alpha$ being an angular acceleration of the drive shaft, and $I_{mot}$ being inertia torque of the motor.

As circumstances require, in response to confirming that the current driving mode is the HEV mode, the third calculator 137 may be configured to calculate inertia compensation torque corresponding to the HEV mode by equations:

$$InertiaCompensationTorque = I_{hev} * a,\ I_{hev} = I_{HSG} + I_{eng} + I_{eng\_clutch} + I_{mot}$$

wherein $I_{hev}$ being inertia torque in the HEV mode, $\alpha$ being an angular acceleration of the drive shaft, $I_{HSG}$ being inertia torque of the HSG, $I_{eng}$ being inertia torque of the engine, $I_{eng\_clutch}$ being inertia torque of the engine clutch, and $I_{mot}$ being inertia torque of the motor.

Further, the fourth calculator 138 may be configured to calculate output torque based on the calculated inertia compensation torque and transmission input torque. If the current driving mode is the EV mode, the fourth calculator 138 may be configured to output torque for compensation by the motor alone in which the inertia torque in the EV mode is compensated for by an equation below:

$$TQ_{mot} = TQ_{TMindemanded} + I_{ev} * \alpha$$

wherein $TQ_{mot}$ being output torque for compensation by the motor alone, $TQ_{TM\ in\ demanded}$ being transmission input torque, $I_{ev}$ being inertia torque in the EV mode, and $\alpha$ being an angular acceleration of the drive shaft.

Additionally, if the current driving mode is the HEV mode, the fourth calculator 138 may be configured to calculate output torque for preferential compensation by the motor in which the inertia torque in the HEV mode is compensated for, confirm whether the calculated output torque for preferential compensation by the motor is greater than maximum torque of the motor, and calculate output torque for subsidiary compensation by the engine in response to confirming that the calculated output torque for preferential compensation by the motor is greater than the maximum torque of the motor, by equations below:

$$TQ_{mot} = (TQ_{TMindemanded} - TQ_{eng}) + I_{hev} * \alpha$$

wherein $TQ_{mot}$ being output torque for preferential compensation by the motor, $TQ_{TM\ in\ demanded}$ being transmission input torque, $TQ_{eng}$ being output torque for subsidiary compensation by the engine, $I_{hev}$ being inertia torque in the HEV mode, and $\alpha$ being an angular acceleration of the drive shaft;

$$TQ_{eng} = (TQ_{TMindemanded} - TQ_{mot} - I'_{hev} * \alpha) + I''_{hev} * \alpha,\ I_{hev} = I'_{hev} + I''_{hev}$$

wherein $TQ_{eng}$ being output torque for subsidiary compensation by the engine, $TQ_{TM\ in\ demanded}$ being transmission input torque, $TQ_{mot}$ being output torque for preferential compensation by the motor, $I_{hev}$ being inertia torque in the HEV mode, and $\alpha$ being an angular acceleration of the drive shaft.

Further, the controller 139 may be configured to operate at least one of the motor controller or the engine controller corresponding to the calculated output torque. When the calculated output torque is the output torque for compensation by the motor alone, the controller 139 may be configured to output a torque command to adjust motor torque that corresponds to the output torque for compensation by the motor alone to the motor controller.

In another case, when the calculated output torque is the output torque for preferential compensation by the motor, the controller 139 may be configured to output a torque command to adjust motor torque that corresponds to the output torque for preferential compensation by the motor to the motor controller. In yet another case, when the calculated output torque is the output torque for subsidiary compensation by the engine, the controller 139 may be configured to output a first torque command to adjust motor torque to the motor controller and output a second torque command to adjust engine torque to the engine controller, that corresponds to the output torque for subsidiary compensation by the engine.

Figure 4:
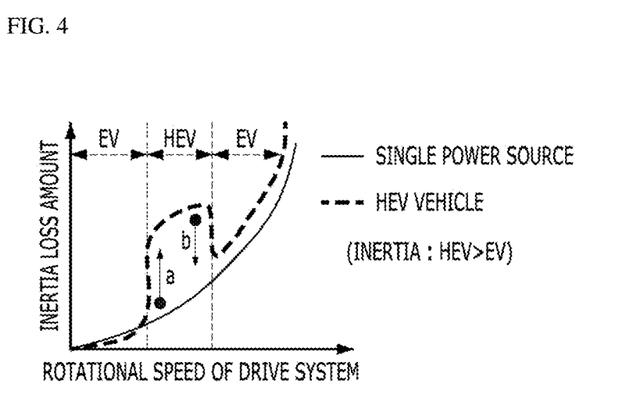
FIG. 4 is a graph illustrating change in inertia of a drive system of a hybrid vehicle accordance with an exemplary embodiment of the present invention.

FIG. 4 is a graph illustrating change in inertia of a drive system of a hybrid vehicle. As exemplarily shown in FIG. 4, in a vehicle having a single driving source (gasoline, diesel or the like), if there is no shifting, an engine and a transmission are always connected, inertia of a drive system in acceleration and deceleration is constant, and thus change in inertia may have characteristics of a continuous function of rotational speed alone.

However, in a hybrid vehicle, if an engine clutch is closed or opened to convert the EV mode to the HEV mode or the HEV mode to the EV mode, lurching may occur due to change in output torque caused by change in inertia of a drive system (e.g., an engine, a motor and a transmission). For example, if the EV mode is converted to the HEV mode (a), inertia loss may be increased.

Therefore, under the condition that driver request torque, when the engine clutch is closed (e.g., conversion from the EV mode to the HEV mode), wheel transmitted torque is decreased and thus a sense of decelerating the vehicle may occur. Further, if the HEV mode is converted to the EV mode (b), inertia loss may be decreased. Therefore, under the condition that driver request torque is constant, when the engine clutch is opened (e.g., conversion from the HEV mode to the EV mode), wheel transmitted torque is increased and thus a sense of pushing the vehicle may occur.

As described above, in the conventional hybrid vehicle, when the engine clutch is closed and opened in addition to change in a rotational speed, change of an inertia element occurs, discontinuity in output torque occurs, and thus lurching (e.g., a sense of deceleration or a sense of being pushed) may occur. Therefore, in the present invention, if request torque is not changed during driving of the hybrid vehicle, change in inertia when the engine clutch is closed and opened is actively compensated for, and thus transmission output torque may not be changed and occurrence of a sense of difference in driving (e.g., a sense of deceleration or a sense of being pushed) before and after the engine clutch is closed and opened may be prevented.

Figure 5:
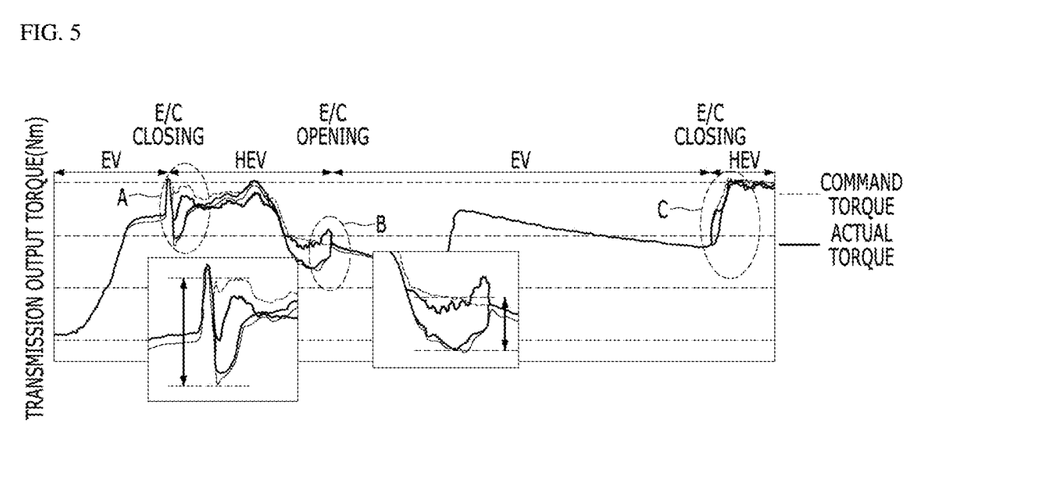
FIG. 5 is a graph representing change of output torque according to closing and opening of an engine clutch of a hybrid vehicle accordance with an exemplary embodiment of the present invention.

FIG. 5 is a graph representing change in output torque according to closing and opening of an engine clutch of a hybrid vehicle. As exemplarily shown in FIG. 5, in the conventional hybrid vehicle, transmission output torque may be varied according to change in inertia before and after the engine clutch is closed.

At a point in time A when the engine clutch is closed and a point in time B when the engine clutch is opened, there is a substantial difference between command torque and actual torque, and thus a sense of difference in driving may occur. On the other hand, at a point in time C, there is a minimal difference between command torque and actual torque, and thus a sense of difference in driving may not occur.

Such a difference between command torque and actual torque in the HEV mode, in which inertia is greater than inertia in the EV mode, may be substantial. Therefore, in the present invention, if request torque is not changed during driving of the hybrid vehicle, change in inertia when the engine clutch is closed and opened is actively compensated for, and thus transmission output torque may not be changed and occurrence of a sense of difference in driving (e.g., a sense of deceleration or a sense of being pushed) before and after the engine clutch is closed and opened may be prevented.

Figure 6:
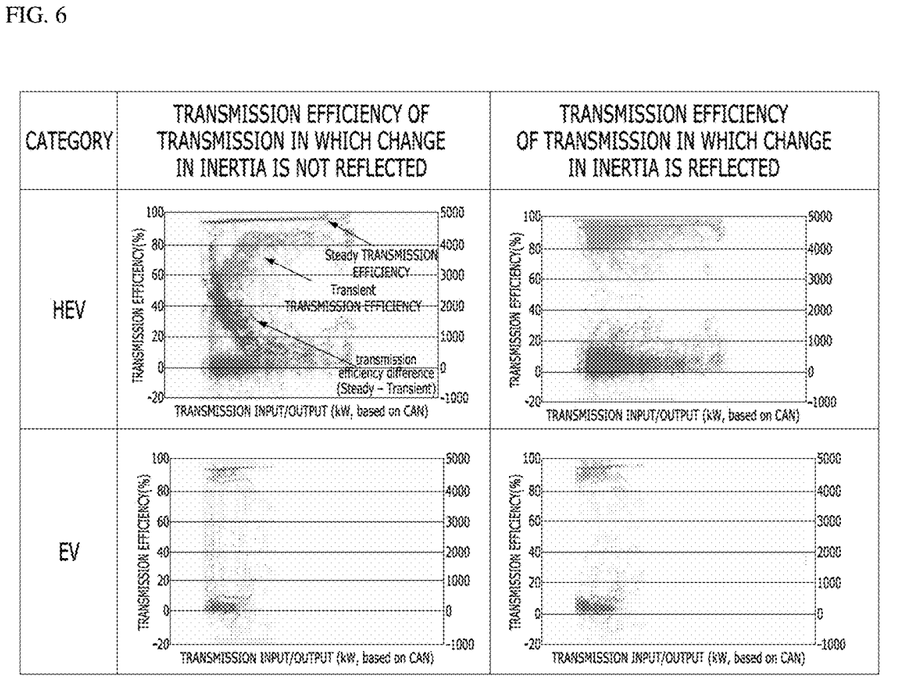
FIG. 6 is a view comparatively illustrating transmission efficiencies of a transmission according to whether or not change in inertia is reflected accordance with an exemplary embodiment of the present invention.

FIG. 6 is a view comparatively illustrating transmission efficiencies of the transmission according to whether or not change in inertia is reflected. As exemplarily shown in FIG. 6, an effect of inertia may be confirmed through comparison between a steady condition in which vehicle speed is constant (without an inertia change amount) and a transient condition in which vehicle speed is varied (with an inertia change amount). Input energy of the transmission may be calculated by an equation Engine Torque+Motor Torque−Change in Inertia, in the HEV mode, and be equal to change in inertia of motor, in the EV mode.

Further, when the input energy of the transmission is the same, output energy of the transmission is reduced due to loss caused by change in inertia and thus transmission efficiency of the transmission may be decreased, in the transient condition with an inertia change amount inertia compared to the steady condition without an inertia change amount. Since inertia in the HEV mode is greater than inertia in the EV mode, a transmission efficiency difference during driving in the HEV mode may be greater than a transmission efficiency difference during driving in the EV mode.

Therefore, in the present invention, since change in inertia of the drive system is reflected in transmission input torque, there may be minimal difference in transmission efficiencies between the transient condition and the steady condition or the transmission efficiencies in the transient condition and the steady condition may be equal.

Figure 7:
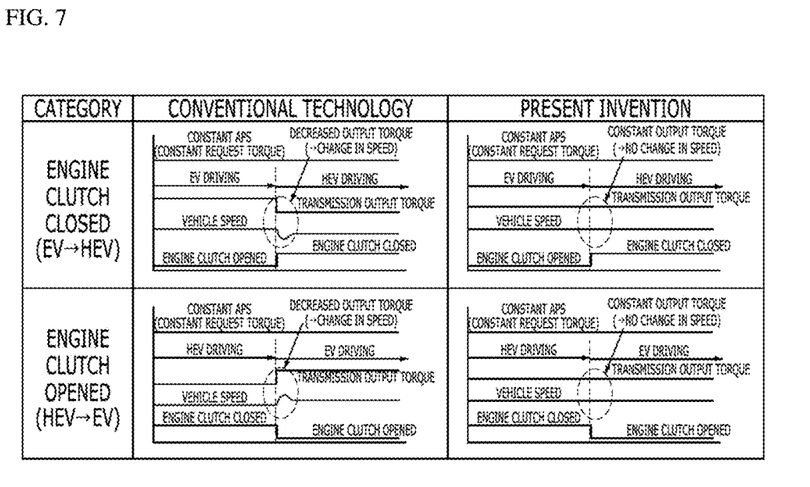
FIG. 7 is a view comparatively illustrating output torques of the transmission according to whether or not change in inertia is reflected accordance with an exemplary embodiment of the present invention.

FIG. 7 is a view comparatively illustrating output torques of the transmission according to whether change in inertia is reflected. As exemplarily shown in FIG. 7, in the conventional hybrid vehicle, when the engine clutch is closed or opened, transmission output torque and vehicle speed may be varied due to change in inertia, but, in the hybrid vehicle in accordance with the present invention, change in inertia when the engine clutch is closed and opened is actively compensated for, and thus transmission output torque and vehicle speed may be uniformly maintained.

Figure 8:
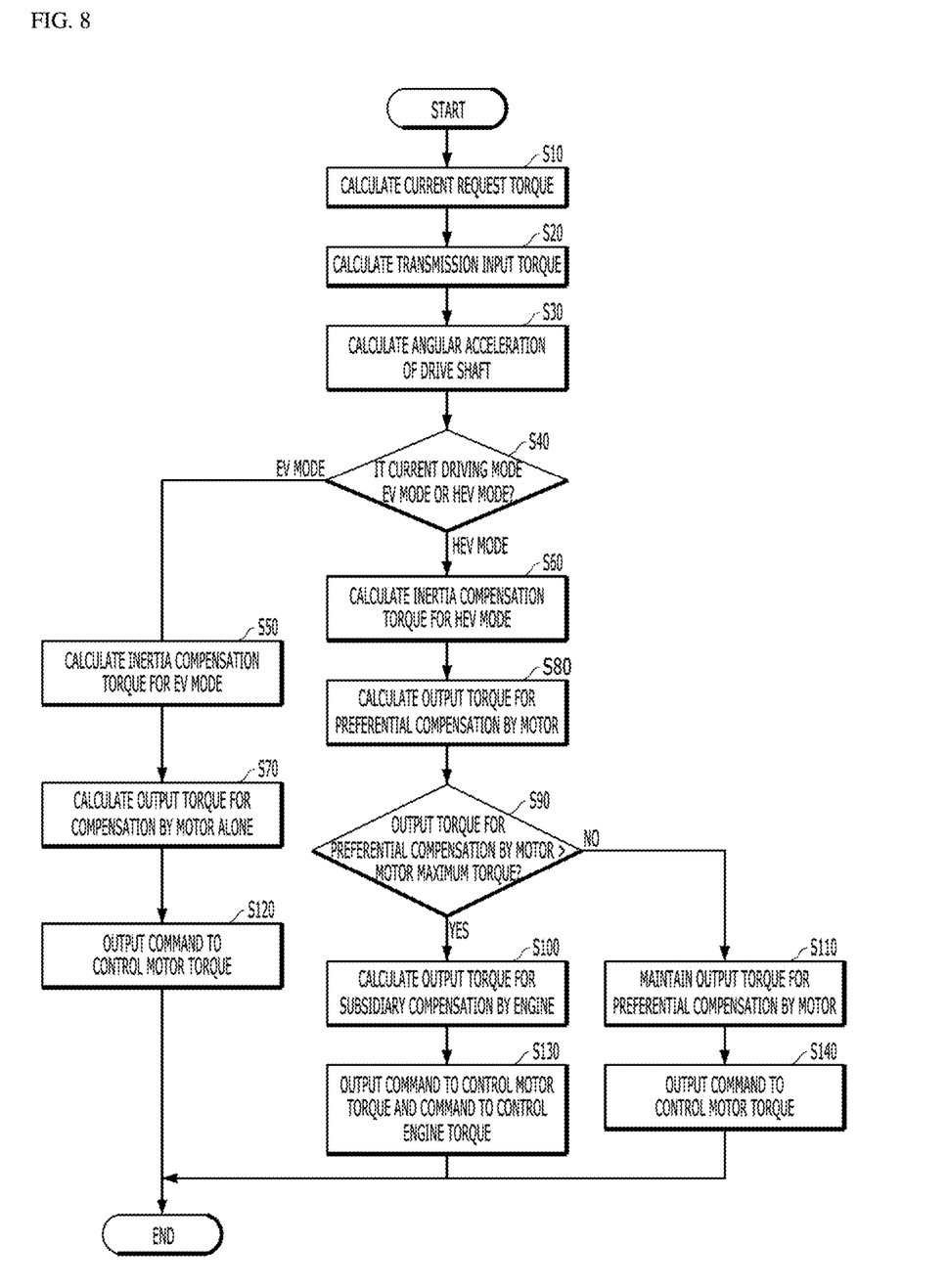
FIG. 8 is a flowchart illustrating a method for controlling output torque of the output torque control apparatus for hybrid vehicles in accordance with an exemplary embodiment of the present invention.

FIG. 8 is a flowchart illustrating a method for adjusting output torque of the output torque control apparatus for hybrid vehicles in accordance with an exemplary embodiment of the present invention. The output torque control apparatus for hybrid vehicles in accordance with the present invention may include the hybrid controller configured to operate the motor controller and the engine controller.

As exemplarily shown in FIG. 8, first, the hybrid controller may be configured to detect a position of an accelerator pedal from an accelerator pedal sensor (APS), and calculate current request torque requested by vehicle wheels based on the detected position of the accelerator pedal (S10). Thereafter, the hybrid controller may be configured to calculate transmission input torque that corresponds to the calculated current request torque, based on the current request torque (S20).

Further, the hybrid controller may be configured to calculate an angular acceleration of the drive shaft connected to the motor and the engine (S30). The hybrid controller may then be configured to confirm whether the current driving mode of the vehicle is the EV mode or the HEV mode (S40). The hybrid controller may be configured to confirm whether the current driving mode of the vehicle is the EV mode or the HEV mode according to the closing or opening operation of the engine clutch.

For example, the hybrid controller may be configured to confirm that the current driving mode is the EV mode when the engine clutch is opened to disconnect the drive shaft between the motor and the engine, and confirm that the current driving mode is the HEV mode when the engine clutch is closed to connect the drive shaft between the motor and the engine. Then, in response to confirming that the current driving mode is the EV mode, the hybrid controller may be configured to calculate inertia compensation torque corresponding to the EV mode by equations:

$$\text{InertiaCompensationTorque} = I_{ev} * \alpha,\ I_{ev} = I_{mot}$$

wherein $I_{ev}$ being inertia torque in the EV mode, $\alpha$ being an angular acceleration of the drive shaft, and $I_{mot}$ being inertia torque of the motor (S50).

In response to confirming that the current driving mode is the HEV mode, the hybrid controller may be configured to calculate inertia compensation torque corresponding to the HEV mode by equations:

$$\text{InertiaCompensationTorque} = I_{hev} * \alpha,\ I_{hev} = I_{HSG} + I_{eng} + I_{eng\_clutch} + I_{mot}$$

wherein $I_{hev}$ being inertia torque in the HEV mode, $\alpha$ being an angular acceleration of the drive shaft, $I_{HSG}$ being inertia torque of the HSG, $I_{eng}$ being inertia torque of the engine, $I_{eng\_clutch}$ being inertia torque of the engine clutch, and $I_{mot}$ being inertia torque of the motor (S60). Thereafter, in response to confirming that the current driving mode is the EV mode, the hybrid controller may be configured to calculate output torque for compensation by the motor alone in which the inertia torque in the EV mode is compensated for (S70).

The hybrid controller may be configured to calculate output torque for compensation by the motor alone by an equation:

$$TQ_{mot} = TQ_{TMindemanded} + I_{ev} * \alpha$$

wherein $TQ_{mot}$ being output torque for compensation by the motor alone, $TQ_{TM\ in\ demanded}$ being transmission input torque, $I_{ev}$ being inertia torque in the EV mode, and $\alpha$ being an angular acceleration of the drive shaft. Thereafter, when the calculated output torque is the output torque for compensation by the motor alone, the hybrid controller may be configured to output a torque command to adjust motor torque that corresponds to the output torque for compensation by the motor alone to the motor controller (S120).

Additionally, in response to confirming that the current driving mode is the HEV mode, the hybrid controller may be configured to calculate output torque for preferential compensation by the motor in which the inertia torque in the HEV mode is compensated for (S80). The hybrid controller may be configured to calculate the output torque for preferential compensation by the motor by an equation:

$$TQ_{mot} = (TQ_{TMindemanded} - TQ_{eng}) + I_{hev} * \alpha$$

wherein $TQ_{mot}$ being output torque for preferential compensation by the motor, $TQ_{TM\ in\ demanded}$ being transmission input torque, $TQ_{eng}$ being output torque for subsidiary compensation by the engine, $I_{hev}$ being inertia torque in the HEV mode, and $\alpha$ being an angular acceleration of the drive shaft.

Further, the hybrid controller may be configured to confirm whether the calculated output torque for preferential compensation by the motor is greater than maximum torque of the motor (S90). Thereafter, the hybrid controller may be configured to calculate output torque for subsidiary compensation by the engine, in response to confirming that the calculated output torque for preferential compensation by the motor is greater than the maximum torque of the motor (S100).

The hybrid controller may then be configured to calculate the output torque for subsidiary compensation by the engine by equations:

$$TQ_{eng} = (TQ_{TMindemanded} - TQ_{mot} - I'_{hev} * \alpha) + I''_{hev} * \alpha,\ I_{hev} = I'_{hev} + I''_{hev}$$

wherein $TQ_{eng}$ being output torque for subsidiary compensation by the engine, $TQ_{TM\ in\ demanded}$ being transmission input torque, $TQ_{mot}$ being output torque for preferential compensation by the motor, $I_{hev}$ being inertia torque in the HEV mode, and α being an angular acceleration of the drive shaft. Thereafter, when the calculated output torque is the output torque for subsidiary compensation by the engine, the hybrid controller may be configured to output a first torque command to control motor torque to the motor controller and output a second torque command to control engine torque to the engine controller, corresponding to the output torque for subsidiary compensation by the engine (S130).

Further, when the calculated output torque for preferential compensation by the motor is less than the maximum torque of the motor, the hybrid controller may be configured to maintain the calculated output torque for preferential compensation by the motor. Thereafter, the hybrid controller may be configured to output a torque command to control motor torque that corresponds to the output torque for preferential compensation by the motor to the motor controller (S140).

Additionally, in the present invention, a process provided by the method for controlling output torque of the output torque control apparatus for hybrid vehicles in accordance with an exemplary embodiment of the present invention may be executed by a non-transitory computer readable recording medium in which a program to execute the method for controlling output torque of the output torque control apparatus for hybrid vehicles is recorded.

A hybrid vehicle in accordance with an exemplary embodiment of the present invention may include a hybrid power source including a motor and an engine, and an output torque control apparatus to adjust output torque of the hybrid power source, and the output torque control apparatus may include a motor controller configured to adjust torque of the motor, an engine controller configured to adjust torque of the engine, and a hybrid controller configured to calculate transmission input torque that corresponds to current request torque, to confirm whether the current driving mode of the hybrid vehicle is the EV mode or the HEV mode, to calculate inertia compensation torque that corresponds to the confirmed current driving mode, to calculate output torque based on the calculated inertia compensation torque and transmission input torque, and to operate at least one of the motor controller or the engine controller based on the calculated output torque.

Accordingly, in the present invention, motor torque and engine torque may be adjusted based on the output torque calculated by compensating for change in inertia occurring when an engine clutch of the hybrid vehicle is closed and opened, and thereby the output torque may be uniformly adjusted and stable control robustness may be secured. In other words, in the present invention, if request torque is not changed during driving of the hybrid vehicle, change in inertia when the engine clutch is closed and opened is actively compensated for, and thus transmission output torque may not be changed and occurrence of a sense of difference in driving (e.g., a sense of deceleration or a sense of being pushed) before and after the engine clutch is closed and opened may be prevented.

The present invention may be implemented as computer readable code in a non-transitory computer readable recording medium in which a program is recorded. Computer readable recording media include all types of recording devices in which data readable by computer systems is stored. For example, the computer readable recording media may include a Hard Disk Drive (HDD), a Solid State Drive (SSD), a Silicon Disk Drive (SDD), a ROM, a RAM, a CD-ROM, a magnetic tape, a floppy disk, an optical data storage system, etc.

As apparent from the above description, an output torque control apparatus, a method for adjusting output torque thereof and a hybrid vehicle including the same in accordance with at least one exemplary embodiment of the present invention may adjust motor torque and engine torque based on output torque calculated by compensating for change in inertia occurring when an engine clutch of a hybrid vehicle is closed and opened, thereby uniformly controlling output torque and thus securing stable control robustness.

In other words, if request torque is not changed during driving of the hybrid vehicle, change in inertia when the engine clutch is closed and opened is actively compensated for, and thus transmission output torque may not be changed and occurrence of a sense of difference in driving (e.g., a sense of deceleration or a sense of being pushed) before and after the engine clutch is closed and opened may be prevented.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

What is claimed is:

1. An output torque control apparatus for hybrid vehicles, comprising:
    a motor controller configured to adjust motor torque;
    an engine controller configured to adjust engine torque; and
    a hybrid controller configured to adjust the motor controller and the engine controller according to driving modes of a hybrid vehicle,
    wherein the hybrid controller is configured to:
        calculate transmission input torque that corresponds to current request torque;
        confirm whether a current driving mode of the hybrid vehicle is an electric vehicle (EV) mode or a hybrid electric vehicle (HEV) mode;
        calculate inertia compensation torque that corresponds to the confirmed current driving mode;
        calculate output torque based on the calculated inertia compensation torque and transmission input torque; and
        operate at least one of the motor controller or the engine controller based on the calculated output torque, and
    wherein, in the calculation of the output torque, in response to confirming that the current driving mode is the HEV mode, the hybrid controller is configured to:
        calculate output torque for first compensation by a motor in which an inertia torque in the HEV mode is compensated for;
        confirm whether the calculated output torque for first compensation by the motor is greater than maximum torque of the motor; and
        calculate output torque for subsidiary compensation by an engine when the calculated output torque for first compensation by the motor is greater than the maximum torque of the motor.

2. The output torque control apparatus for hybrid vehicles according to claim 1, wherein, in the calculation of the transmission input torque corresponding to the current request torque, the hybrid controller is configured to detect a position of an accelerator pedal from an accelerator pedal sensor (APS), calculate the current request torque requested by vehicle wheels based on the detected position of the accelerator pedal, and calculate the transmission input torque corresponding to the calculated current request torque.

3. The output torque control apparatus for hybrid vehicles according to claim 1, wherein the hybrid controller is configured to calculate an angular acceleration of a drive shaft connected to the motor and the engine of the hybrid vehicle, prior to the confirmation of the current driving mode of the hybrid vehicle.

4. The output torque control apparatus for hybrid vehicles according to claim 1, wherein, in the confirmation of the current driving mode of the hybrid vehicle, the hybrid controller is configured to confirm whether the current driving mode is the EV mode or the HEV mode based on a closing or opening operation of an engine clutch.

5. The output torque control apparatus for hybrid vehicles according to claim 1, wherein, in the calculation of the output torque, in response to confirming that the current driving mode is the EV mode, the hybrid controller is configured to calculate output torque for compensation by the motor alone in which the inertia torque in the EV mode is compensated for.

6. The output torque control apparatus for hybrid vehicles according to claim 1, wherein, in the operation of the at least one of the motor controller or the engine controller, when the calculated output torque is the output torque for compensation by the motor alone, the hybrid controller is configured to output a torque command to adjust the motor torque corresponding to the output torque for compensation by the motor alone to the motor controller.

7. The output torque control apparatus for hybrid vehicles according to claim 1, wherein, in the operation of the at least one of the motor controller or the engine controller, when the calculated output torque is the output torque for first compensation by the motor, the hybrid controller is configured to output a torque command to adjust the motor torque corresponding to the output torque for first compensation by the motor to the motor controller.

8. The output torque control apparatus for hybrid vehicles according to claim 1, wherein, in the operation of the at least one of the motor controller or the engine controller, when the calculated output torque is the output torque for second compensation by the engine, the hybrid controller is configured to output a first torque command to adjust the motor torque to the motor controller and output a second torque command to adjust the engine torque to the engine controller, corresponding to the output torque for second compensation by the engine.

9. The output torque control apparatus for hybrid vehicles according to claim 1, wherein the hybrid controller includes:
a first calculator configured to calculate the current request torque, requested by vehicle wheels, based on an input position of an accelerator pedal;
a second calculator configured to calculate the transmission input torque based on the calculated current request torque;
a driving mode determination unit configured to confirm whether the current driving mode of the hybrid vehicle is the EV mode or the HEV mode;
a third calculator configured to the inertia compensation torque corresponding to the confirmed current driving mode;

a fourth calculator configured to calculate the output torque based on the calculated inertia compensation torque and transmission input torque; and
a controller configured to operate at least one of the motor controller or the engine controller based on the calculated output torque.

10. A method for controlling output torque of an output torque control apparatus for hybrid vehicles, the output torque control apparatus including a hybrid controller configured to operate a motor controller and an engine controller, the method comprising:
calculating, by the hybrid controller, transmission input torque that corresponds to current request torque;
confirming, by the hybrid controller, whether a current driving mode of a hybrid vehicle is an electric vehicle (EV) mode or a hybrid electric vehicle (HEV) mode;
calculating, by the hybrid controller, inertia compensation torque that corresponds to the confirmed current driving mode;
calculating, by the hybrid controller, output torque based on the calculated inertia compensation torque and transmission input torque; and
operating, by the hybrid controller, at least one of the motor controller or the engine controller based on the calculated output torque,
wherein the calculating the output torque corresponding to the confirmed driving mode, in response to confirming that the current driving mode is the HEV mode, comprises:
calculating, by the hybrid controller, output torque for first compensation by a motor in which an inertia torque in the HEV mode is compensated for,
confirming, by the hybrid controller, whether the calculated output torque for first compensation by the motor is greater than maximum torque of the motor; and
calculating, by the hybrid controller, output torque for second compensation by an engine when the calculated output torque for first compensation by the motor is greater than the maximum torque of the motor.

11. The method according to claim 10, wherein the calculating the transmission input torque corresponding to the current request torque includes:
detecting, by the hybrid controller, a position of an accelerator pedal from an accelerator pedal sensor (APS);
calculating, by the hybrid controller, the current request torque requested by vehicle wheels based on the detected position of the accelerator pedal; and
calculating, by the hybrid controller, the transmission input torque based on the calculated current request torque.

12. The method according to claim 10, further comprising:
calculating, by the hybrid controller, an angular acceleration of a drive shaft connected to the motor and the engine of the hybrid vehicle, prior to the confirming whether the current driving mode of the hybrid vehicle is the EV mode or the HEV mode.

13. The method according to claim 10, wherein whether the current driving mode of the hybrid vehicle is the EV mode or the HEV mode is confirmed based on a closing or opening operation of an engine clutch.

14. The method according to claim 10, further comprising:
in response to confirming that the current driving mode is the EV mode, calculating, by the hybrid controller, output torque for compensation by the motor alone in which the inertia torque in the EV mode is compensated for.

15. The method according to claim 10, wherein, in the operating of the at least one of the motor controller or the engine controller, when the calculated output torque is the output torque for compensation by the motor alone, a torque command to adjust the motor torque corresponding to the output torque for compensation by the motor alone is output to the motor controller.

16. The method according to claim 10, wherein, in the operating of the at least one of the motor controller or the engine controller, when the calculated output torque is the output torque for first compensation by the motor, a torque command to adjust the motor torque corresponding to the output torque for first compensation by the motor is output to the motor controller.

17. The method according to claim 10, wherein, in the operating of the at least one of the motor controller or the engine controller, when the calculated output torque is the output torque for second compensation by the engine, a first torque command to adjust the motor torque is output to the motor controller and a second torque command to adjust the engine torque is output to the engine controller, corresponding to the output torque for second compensation by the engine.

18. A hybrid vehicle, comprising:
a hybrid power source including a motor and an engine; and
an output torque control apparatus configured to adjust output torque of the hybrid power source,
wherein the output torque control apparatus includes:
a motor controller configured to adjust torque of the motor;
an engine controller configured to adjust torque of the engine; and
a hybrid controller configured to calculate transmission input torque corresponding to current request torque, confirm whether a current driving mode of the hybrid vehicle is an electric vehicle (EV) mode or a hybrid electric vehicle (HEV) mode, calculate inertia compensation torque corresponding to the confirmed current driving mode, calculate output torque based on the calculated inertia compensation torque and transmission input torque, and operate at least one of the motor controller or the engine controller based on the calculated output torque, and
wherein, in the calculation of the output torque, in response to confirming that the current driving mode is the HEV mode, the hybrid controller is configured to:
calculate output torque for first compensation by the motor in which an inertia torque in the HEV mode is compensated for;
confirm whether the calculated output torque for first compensation by the motor is greater than maximum torque of the motor; and
calculate output for subsidiary compensation by the engine when the calculated output torque for first compensation by the motor is greater than the maximum torque of the motor.

* * * * *